United States Patent [19]
Uwabo et al.

[11] Patent Number: 6,005,752
[45] Date of Patent: Dec. 21, 1999

[54] MAGNETIC DATA RECORDING/ REPRODUCING DEVICE HAVING A LINEAR MOTOR WHICH INCLUDES A PAIR OF COILS INTEGRALLY ASSEMBLED WITH A CARRIAGE ASSEMBLY ON BOTH SIDES THEREOF

[75] Inventors: Tsuneo Uwabo, Hachiouji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 08/967,180

[22] Filed: Nov. 10, 1997

[30] Foreign Application Priority Data

Nov. 11, 1996 [JP] Japan .................................. 8-299083
Nov. 13, 1996 [JP] Japan .................................. 8-301707

[51] Int. Cl.$^6$ ........................................................ G11B 5/55
[52] U.S. Cl. ................................................................. 360/106
[58] Field of Search ............................. 360/97.01, 97.02, 360/97.03, 97.04, 98.01, 99.01, 105, 106, 107; 369/244, 246, 247, 248, 249, 263

[56] References Cited

U.S. PATENT DOCUMENTS 4,594,627 6/1986 Viskochil et al. ...................... 360/105
5,060,101 10/1991 Isomura .................................. 360/106

FOREIGN PATENT DOCUMENTS

61-269321 11/1986 Japan .

Primary Examiner—David D. Davis
Attorney, Agent, or Firm—Frishauf, Holtz, Goodman, Langer & Chick, P.C.

[57] ABSTRACT

In a magnetic data recording/reproducing device comprising a linear motor mounted on a main plate for driving a carriage assembly having a magnetic head, the linear motor comprises a pair of coils integrally arranged with the carriage assembly on both sides thereof and a pair of magnetic circuit devices for generating magnetic fields in a direction intersecting that of electric currents flowing through the pair of coils. The linear motor further comprises a cover plate fixed to the main plate such that the pair of magnetic circuit devices are held on the main plate. The cover plate is integrally provided with a pair of urging members for urging the pair of magnetic circuit devices from upward.

10 Claims, 7 Drawing Sheets

MAGNETIC DATA RECORDING/ REPRODUCING DEVICE HAVING A LINEAR MOTOR WHICH INCLUDES A PAIR OF COILS INTEGRALLY ASSEMBLED WITH A CARRIAGE ASSEMBLY ON BOTH SIDES THEREOF

BACKGROUND OF THE INVENTION

The present invention relates to a magnetic data recording/reproducing device for recording and reproducing data on and from a disk-shaped magnetic recording medium through a magnetic head. More specifically, the present invention relates to a magnetic data recording/reproducing device comprising a linear motor for use in driving a carriage assembly having a magnetic head mounted thereon in a radial direction relative to a magnetic recording medium.

As well known in the art, flexible disk drives are a type of magnetic data recording/reproducing device on which a flexible disk can be mounted for the purpose of recording and reproducing data. Flexible disks have recently been increased in storage capacity. Typical flexible disks have a storage capacity of 1–2 megabytes (hereinafter, referred to as a normal capacity). There have been developed flexible disks with a storage capacity of 128 megabytes (hereinafter, referred to as a large capacity). In response to this, flexible disk drives have also been developed that can be used with a flexible disk of the large capacity.

The flexible disk drives used with a flexible disk of the normal capacity is different in mechanism from those used with a flexible disk of the large capacity. One of the differences lies in the structure of driving means for use in driving a carriage assembly having a magnetic head mounted thereon in a predetermined radial direction relative to a flexible disk mounted within the flexible disk drive. More specifically, the flexible disk drive for the normal-capacity flexible disk uses a stepping motor as the driving means. On the other hand, the flexible disk drive for the large-capacity flexible disk uses a linear motor as the driving means. Such a linear motor is called a voice coil motor.

The linear motor that is used as the driving means for the flexible disk drives used with the flexible disk of the large capacity will now be described. The linear motor comprises a pair of coils integrally assembled with the carriage assembly on both sides thereof, and a pair of magnetic circuit devices for generating a magnetic field in a direction intersecting that of an electric current flowing through the pair of coils.

Now, the description will be made with regard to one of the pair of magnetic circuit devices. The magnetic circuit device typically comprises a permanent magnet polarized along the thickness thereof and a yoke member. The yoke member comprises a center yoke which serves as a drive axis, a back yoke, and a pair of side yokes. The center yoke extends in the direction along which the carriage assembly moves and passes through the coil. The back yoke has a main surface extending in parallel with the center yoke at a certain distance and being opposed to the center yoke. The pair of side yokes are for magnetically connecting both ends of the center yoke with corresponding ends of the back yoke. The permanent magnet is fixed to the main surface of the back yoke. The center yoke, the back yoke, and the side yokes are each made of a steel plate having a thickness of at least 3 mm.

With this structure, by causing the electric current to flow through the coil in a direction intersecting that of the magnetic field generated by the magnetic circuit device, a drive force occurs in a direction extending to the drive axis on the basis of interaction of the electric current with the magnetic field. The drive force causes the linear motor to move the carriage assembly in the predetermined radial direction.

By the way, the pair of magnetic circuit devices should be mounted on a main substrate or plate of the flexible disk drive so as not to cause a positional deviation thereof. The pair of magnetic circuit devices have leakage flux because the permanent magnet is made of an advanced magnetic material. The leakage flux tends to adversely influence the magnetic head mounted on the carriage assembly.

SUMMARY OF THE INVENTION

Therefore, an object of the present invention is to provide a magnetic data recording/reproducing device comprising a linear motor having a pair of magnetic circuit devices which are securely mounted on a main plate.

Another object of the present invention is to provide a magnetic data recording/reproducing device comprising a structure which is capable of eliminating an adverse influence caused by leakage flux of a pair of magnetic circuit devices.

The present invention is applicable to a magnetic data recording/reproducing device comprising a disk holder for holding a disk-shaped magnetic recording medium, a linear motor mounted on a main plate of the magnetic data recording/reproducing device for driving a carriage assembly comprising a magnetic head mounted thereon for recording and reproducing data on and from the magnetic recording medium, in a predetermined radial direction relative to the magnetic recording medium.

According to an aspect of the present invention, the linear motor comprises a pair of coils integrally assembled with a carriage assembly on both sides thereof, and a pair of magnetic circuit devices for generating magnetic fields in a direction intersecting that of electric currents flowing through the pair of coils. Each of the magnetic circuit devices comprises a center yoke, a back yoke, and a permanent magnet. The center yoke extends in a driving direction parallel to a predetermined radial direction and passes through the coil. The back yoke has a main surface extending in parallel with the center yoke at a certain distance and being opposed to the center yoke. The back yoke also has bent portions at both ends thereof each of which is bent at a generally right angle. Free ends of the bent portions are magnetically connected to the corresponding ends of the center yoke. The permanent magnet is fixed to the main surface of the back yoke. The linear motor further comprises a cover plate fixed to the main plate such that a pair of combinations of the center yoke and the back yoke 7 are held on the main plate. The cover plate is integrally provided with a pair of urging members for urging the pair of combinations of the outer yoke and the back yoke from upward.

DESCRIPTION OF THE PREFERRED EMBODIMENT

Figure 1:
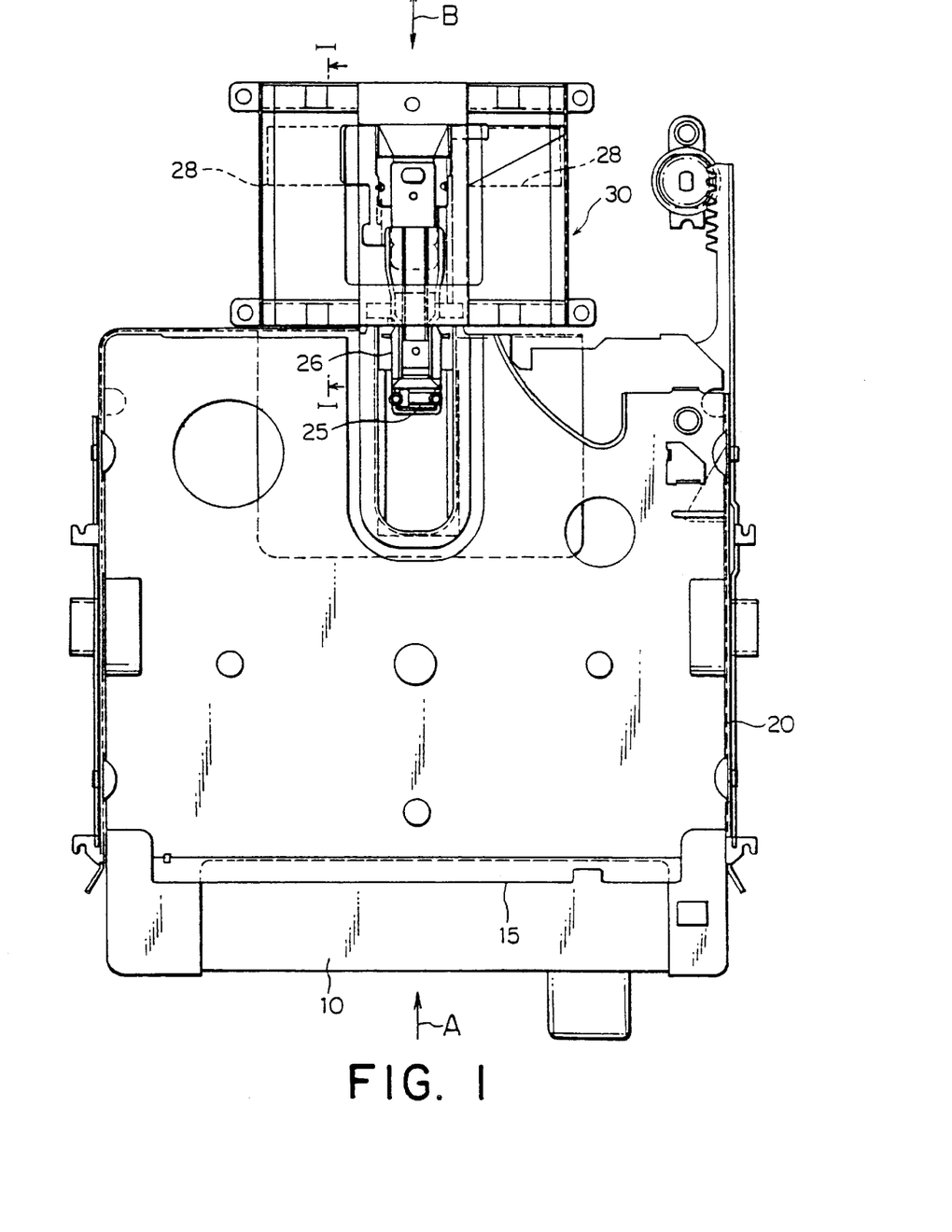
FIG. 1 is a plan view illustrating internal structure of a flexible disk drive to which a linear motor according to the present invention is applied.

Referring to FIG. 1, a magnetic data recording/reproducing device is described to which a linear motor according to the present invention is applied. The magnetic data recording/reproducing device is a flexible disk drive (FDD) on which a flexible disk (not shown) of a normal capacity or a large capacity can be mounted for the purpose of recording and reproducing data. The flexible disk is depicted at 10 and is inserted into the flexible disk drive from the direction indicated by an arrow A in FIG. 1. The flexible disk 10 inserted is held by a disk holder 15. The flexible disk 10 held by the disk holder 15 is mounted on a disk table assembly (not shown) which is rotatably supported on a main substrate or plate 20. The disk table assembly is rotated by a disk drive motor (not shown) provided on a back surface of the main plate 20. The flexible disk is rotated in response to rotation of the disk drive motor. The main plate 20 is also provided with, on the back surface thereof, a printed wire board (not shown) where a number of electronic parts are mounted.

Figure 2:
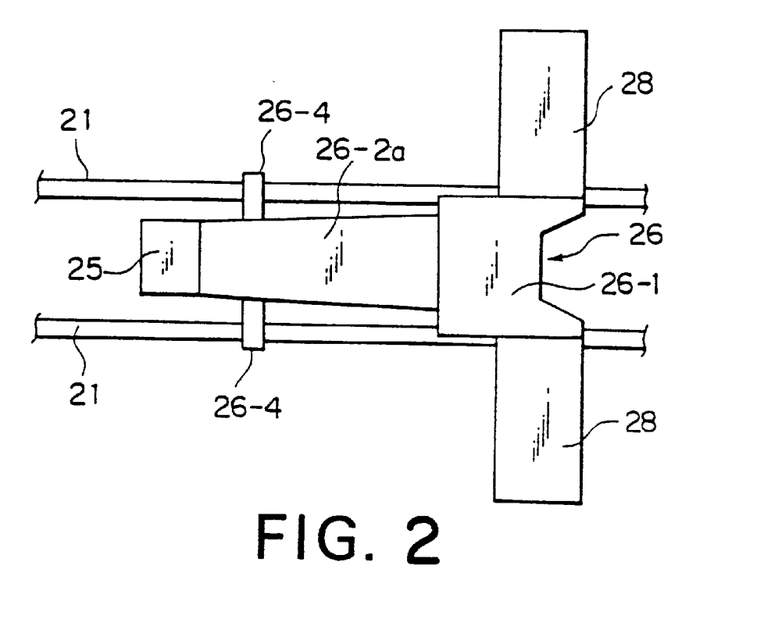
FIG. 2 is a plan view illustrating schematic structure of a carriage assembly in FIG. 1.

The flexible disk drive comprises a magnetic head (not shown) for recording and reproducing data on and from the flexible disk 10. The magnetic head is supported by a carriage 26 through a gimbal plate 25. A combination of the gimbal plate 25 and the carriage 26 is called a carriage assembly. The carriage 26 is positioned over the main plate 20 at a distance from the main plate 20. The carriage 26 holds the magnetic head such that the carriage 26 can move the magnetic head in a predetermined radial direction (depicted by an arrow B in FIG. 1) relative to the flexible disk 10. As shown in FIG. 2, the carriage 26 is supported and guided at both sides thereof by a pair of guide bars 27 extending in the predetermined radial direction B.

The carriage 26 is driven in the predetermined radial direction B by a linear motor described more in detail below. The linear motor is called a voice coil motor and is positioned at a rear portion of the magnetic data recording/reproducing device. The linear motor comprises a pair of coils 28, and a pair of magnetic circuit devices 30 for generating a magnetic field in a direction intersecting that of electric currents flowing through the coils 28.

Figure 3:
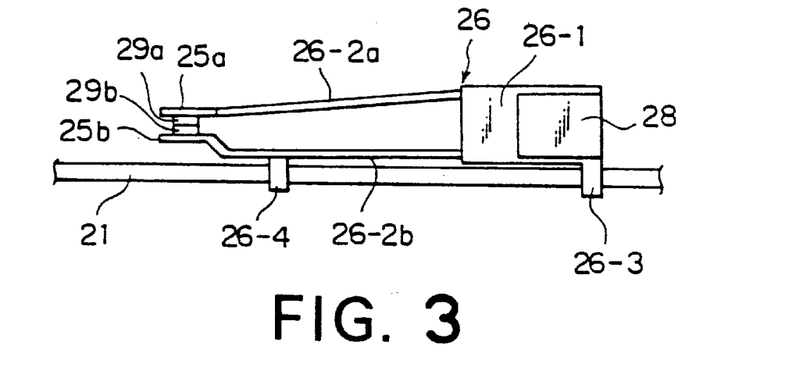
FIG. 3 is a side view of the carriage assembly in FIG. 2.

Referring also to FIGS. 2 and 3, the carriage assembly is described briefly. The carriage assembly comprises a carriage body 26-1, an upper carriage 26-2a, a lower carriage 26-2b, an upper gimbal plate 25a provided at the tip of the upper carriage 26-2a, and a lower gimbal plate 25b provided at the tip of the lower carriage 26-2b. The pair of coils 28 are integrally assembled with the carriage body 26-1 on both sides thereof. The upper and the lower gimbal plates 25a and 25b hold an upper magnetic head 29a and a lower magnetic head 29b, respectively. Projected members 26-3 are provided on both sides of the carriage body 26-1 at a lower portion thereof. The guide bar 21 is passing through the projected members 26-3. Likewise, projected members 26-4 are provided both sides of the lower carriage 26-2b with the guide bar 21 passing therethrough. The upper carriage 26-2a is rotatable in a vertical direction about the joint with the carriage body 26-1, a description of which structure is omitted here.

Referring to FIGS. 1 and 4 through 6, the linear motor according to a preferred embodiment of the present invention is described. The magnetic circuit device 30 comprises a permanent magnet 31 polarized along the thickness thereof and a yoke member. The yoke member comprises a center yoke 32 and a back yoke 33. The center yoke 32 extends in the direction along which the carriage assembly moves and passes through the coil 28. The back yoke 33 has a main surface 33a extending in parallel with the center yoke 32 at a certain distance and being opposed to the center yoke 32. The back yoke 33 has end portions 33b each of which is bent at a generally right angle by means of press working. The end portions 33b are magnetically connected to the corresponding ends of the center yoke 32. The permanent magnet 31 is fixed to the main surface 33a of the back yoke 33. The center yoke 32 and the back yoke 33 are each made of a steel plate having a thickness of at least 3 mm.

Figure 6:
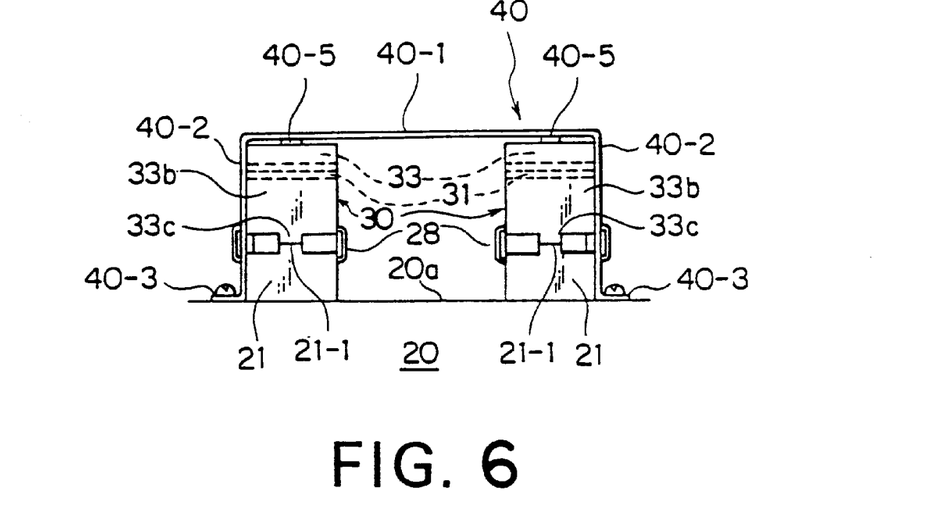
FIG. 6 is a front view of the linear motor in FIG. 5.

As shown in FIG. 6, the main plate 20 has four pedestals 21 (only two of which are illustrated) for use in arranging the magnetic circuit device 30 to be apart from a main surface 20a of the main plate 20. Each pedestal 21 has a projected member 21-1 which is projected upward from the pedestal 21. The height of the projected member 21-1 is smaller than the thickness of the center yoke 32. The center yoke 32 has notches 32a formed in both ends thereof which the corresponding projected members 21-1 are engaged with. The projected members 21-1 of the pedestal 21 thus serve to position the center yoke 32. The back yoke 33 is provided with projections 33c formed on both ends 33b of the back yoke 33. The projections 33c are engaged with the corresponding notches 32a. The height of the projections 33c is approximately equal to the difference obtained by means of subtracting the height of the projected member 21-1 from the height of the center yoke 32. The notches 32a in the center yoke 32 serve to position the back yoke 33.

In the linear motor having the structure as described above, the permanent magnet 31 generates magnetic fields across the space between the center yoke 32 and the back yoke 33. By passing the currents through the coils 28 in the direction intersecting that of the magnetic fields, the driving force acts on the coils 28 due to the interaction between the electric currents and the magnetic fields, which the driving force acts in the direction along with the center yoke 32 extends, i.e., the driving direction. This driving force allows the coils 28 to move the carriage assembly in the predetermined radial direction B.

Figure 5:
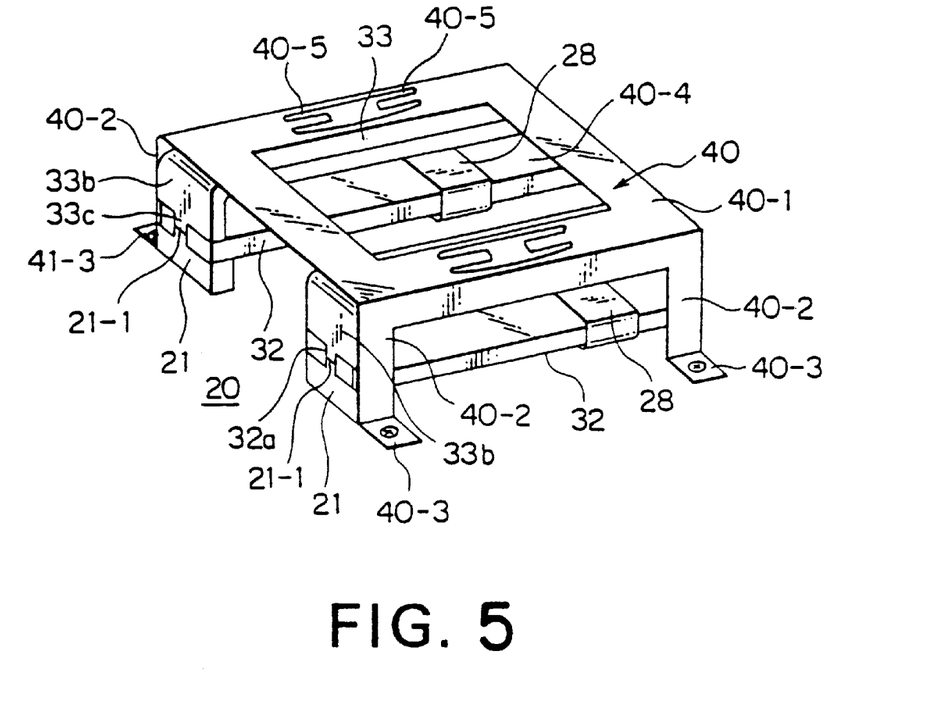
FIG. 5 is a perspective view of a linear motor according to the present invention.
Figure 7:
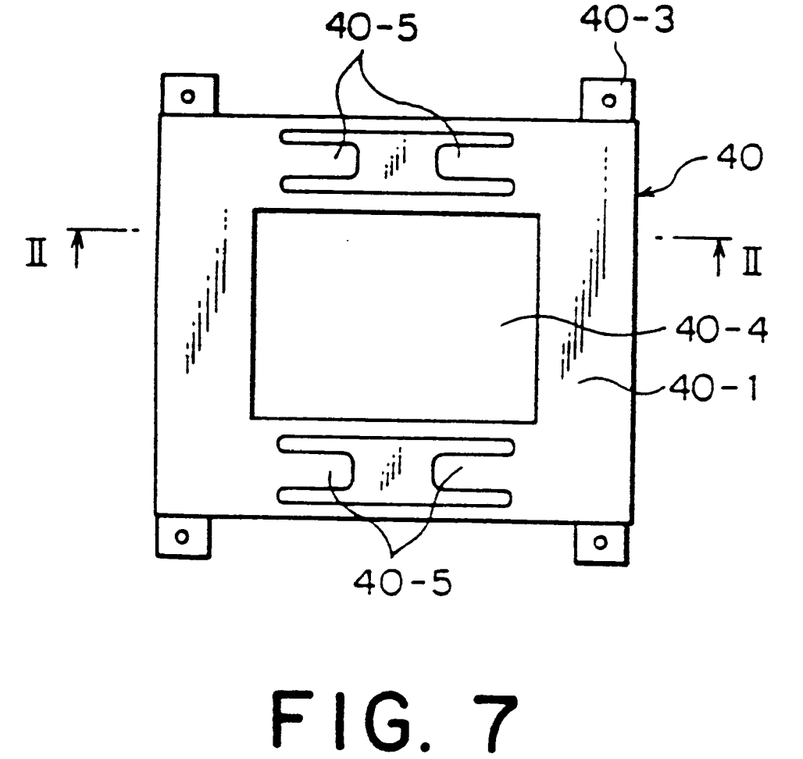
FIG. 7 is a plan view of a cover plate shown in FIG. 5.
Figure 8:
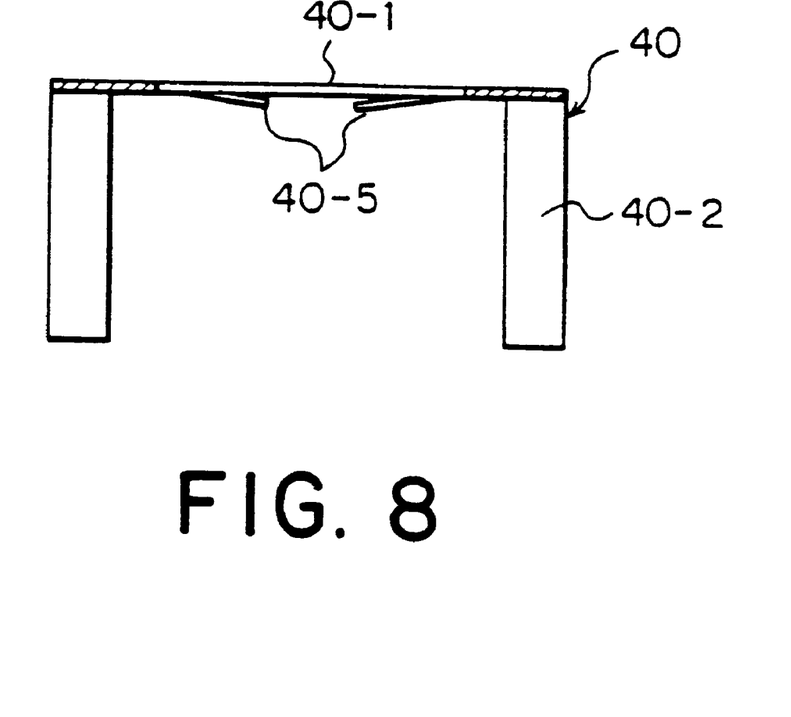
FIG. 8 is a sectional view taken substantially along the lines II—II in FIG. 7.

Referring to FIGS. 7 and 8 together with FIG. 5, the linear motor further comprises a cover plate 40 to be used to fix the pair of magnetic circuit devices to the main plate 20. The cover plate 40 comprises a main plate member 40-1, leg members 40-2, and fixing portions 40-3. The main plate member 40-1 is for holding the two back yokes 33 from upward. The leg members 40-2 are extended downward from the main plate 40-1 at four corners thereof. The fixing portions 40-3 are formed at the lower end of the respective leg members 40-2 to fix the cover plate 40 to the main plate 20 with screws. The fixing portions 40-3 are each formed by means of folding. The main plate member 40-1 is provided with an opening 404 formed therein.

In particular, the fixing portions 40-3 are projected on the sides of the center yoke 32 or the back yoke 33. This allows a smaller dimension of the magnetic circuit device along the driving direction, which in turn reduces the front-to-back dimension or the depth of the magnetic data recording/reproducing device.

The cover plate 40 is integrally provided with two pairs of urging members 40-5. Each of the two pairs corresponds to each of the pair of combinations of the center yoke 32 and the back yoke 33. The pair of urging members 40-5 are for urging the combination of the center yoke 32 and the back yoke 33 from upward. Each of the urging members 40-5 is formed by cutting a part of the main plate member 40-1 as a cut portion and then bending downwardly the cut portion as shown in FIG. 8. Thus, the pair of magnetic circuits are securely mounted on the main plate 20 by the urging members 40-5.

Figure 9:
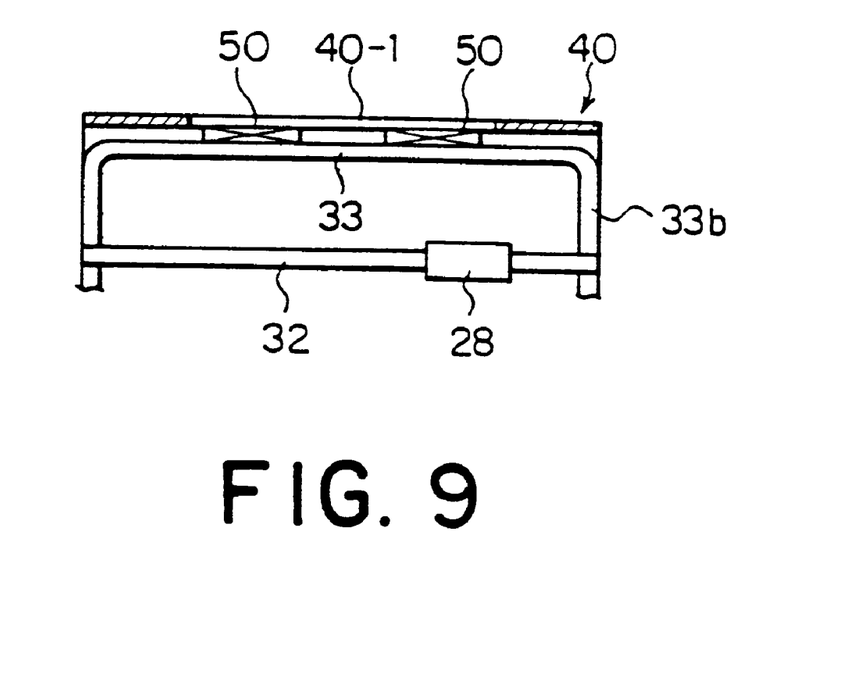
FIG. 9 is a sectional view of another example of the linear motor according to the present invention.

With reference to FIG. 9, the linear motor comprises two pairs of elastic members 50 in place of two pairs of urging members 40-5 shown in FIG. 7. The pair of elastic members 50 are intervened between the main plate member 40-1 and the magnetic circuit device, in particular, the back yoke 33. The elastic member 50 is implemented by a rubber plate or a plate-shaped spring and urges the combination of the center yoke 32 and the back yoke 33 from upward.

Figure 10:
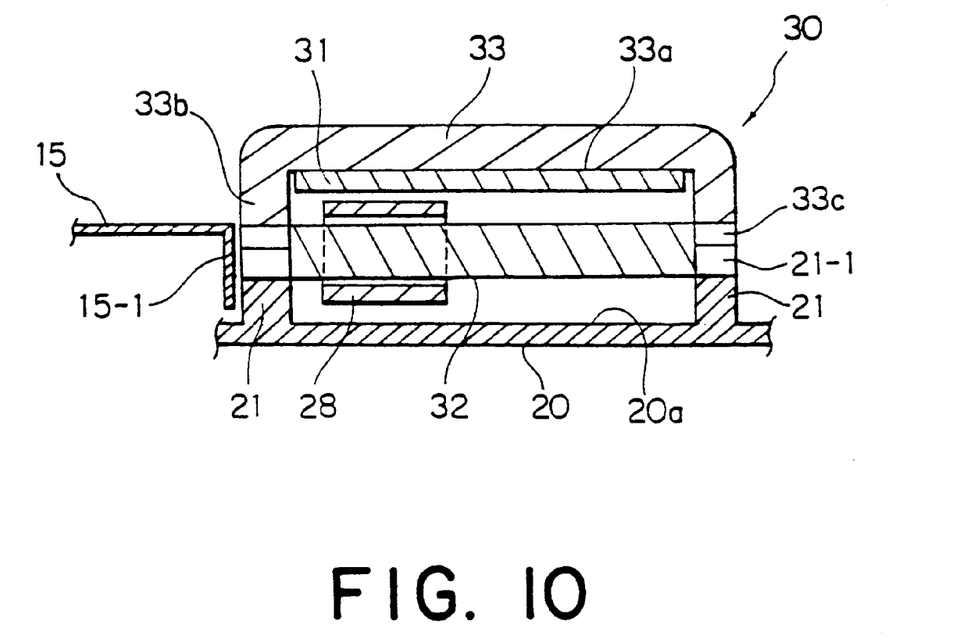
FIG. 10 is a sectional view taken substantially along the lines I—I in FIG. 1.

With reference to FIG. 10, the disk holder 15 is provided with a magnetic shielding member 15-1 for shielding leakage flux leaking from the pair of magnetic circuit devices. The magnetic shielding member 15-1 is formed by bending downwardly a back end portion of the disk holder 15. The magnetic shielding member 15-1 eliminates that the leakage flux influences the magnetic head held by the carriage assembly.

Figure 4:
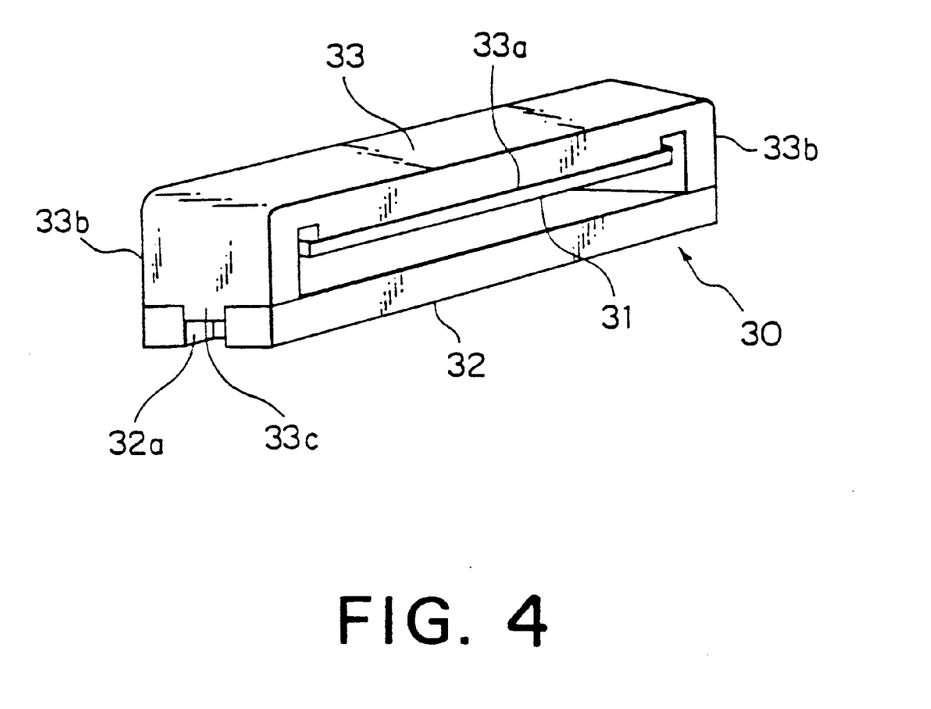
FIG. 4 is a perspective view of a magnetic circuit device for a linear motor according to the present invention.

It is understood that the present invention is not limited to the above mentioned embodiment and various changes and modifications can be made without departing from the scope and spirit of the present invention. For example, while the present invention has been described in conjunction with the flexible disk drive to which it is applied, it is applicable to other types of magnetic data recording/reproducing devices. In FIG. 4, although the end portions 33b are provided with the projections 33c, the end portions 33b may be provided with notches. In this case, the center yoke 32 is provided with projections formed on both ends thereof and engaged with the corresponding notches.

What is claimed is:

1. A magnetic data recording/reproducing device comprising:
    a disk holder for holding a disk-shaped magnetic recording medium; and
    a linear motor mounted on a main plate of said magnetic data recording/reproducing device for driving a carriage assembly comprising a magnetic head mounted thereon for recording and reproducing data on and from the magnetic recording medium,
    wherein the carriage assembly is driven in a predetermined radial direction relative to the magnetic recording medium,
    wherein said linear motor comprises:
        a pair of coils integrally arranged with the carriage assembly on both sides thereof; and
        a pair of magnetic circuit devices for generating magnetic fields in a direction intersecting a magnetic field of electric currents flowing through the pair of coils,
    wherein each of the pair of magnetic circuit devices comprises:
        a center yoke extending along a driving direction parallel to the predetermined radial direction and passing through the coil;
        a back yoke having a main surface opposed to the center yoke and extending in parallel with the center yoke at a certain distance therefrom, the back yoke having bent portions each of which is bent at a generally right angle and each of which is magnetically connected to a corresponding end of the center yoke; and
        a permanent magnet fixed to the main surface of the back yokes,
    wherein said linear motor further comprises a cover plate fixed to the main plate such that a pair of combinations of the center yoke and the back yoke are held on the main plate; and
    wherein said cover plate is integrally provided with a pair of urging members for urging the pair of combinations of the center yoke and the back yoke are urged toward the main plate from an upward direction.

2. A magnetic recording/reproducing device as claimed in claim 1, wherein said cover plate comprises a non-magnetic material.

3. A magnetic recording/reproducing device as claimed in claim 1, wherein said disk holder is provided with a magnetic shielding member for shielding leakage flux leaking from the pair of magnetic circuit devices.

4. A magnetic recording/reproducing device as claimed in claim 2, wherein said magnetic shielding member is formed by bending a back end portion of said disk holder in a downward direction.

5. A magnetic recording/reproducing device as claimed in claim 2, wherein said wherein said disk holder is provided with a magnetic shielding member for shielding leakage flux leaking from the pair of magnetic circuit devices.

6. A magnetic data recording/reproducing device comprising:
    a disk holder for holding a disk-shaped magnetic recording medium; and
    a linear motor mounted on a main plate of said magnetic data recording/reproducing device for driving a carriage assembly comprising a magnetic head mounted thereon for recording and reproducing data on and from the magnetic recording medium,
    wherein the carriage assembly is driven in a predetermined radial direction relative to the magnetic recording medium,
    wherein said linear motor comprises:
        a pair of coils integrally arranged with the carriage assembly on both sides thereof; and
        a pair of magnetic circuit devices for generating magnetic fields in a direction intersecting a magnetic field of electric currents flowing through the pair of coils,
    wherein each of the pair of magnetic circuit devices comprises:
        a center yoke extending along a driving direction parallel to the predetermined radial direction and passing through the coil;
        a back yoke having a main surface opposed to the center yoke and extending in parallel with the center yoke at a certain distance therefrom, the back yoke having bent portions each of which is bent at a generally right angle and each of which is magnetically connected to a corresponding end of the center yoke; and
        a permanent magnet fixed to the main surface of the back yokes,
    wherein said linear motor further comprises a cover plate fixed to the main plate such that a pair of combinations of the center yoke and the back yoke are held on the main plate; and wherein a pair of elastic members are provided between the cover plate and the pair of combinations of the center yoke and the back yoke such that the pair of combinations of the center yoke and the back yoke are urged are urged toward the main plate from an upward direction.

7. A magnetic recording/reproducing device as claimed in claim 6, wherein said cover plate comprises a non-magnetic material.

8. A magnetic recording/reproducing device as claimed in claim 7, wherein said disk holder is provided with a magnetic shielding member for shielding leakage flux leaking from the pair of magnetic circuit devices.

9. A magnetic recording/reproducing device as claimed in claim 6, wherein said disk holder is provided with a magnetic shielding member for shielding leakage flux leaking from the pair of magnetic circuit devices.

10. A magnetic recording/reproducing device as claimed in claim 9, wherein said magnetic shielding member is formed by bending a back end portion of said disk holder in a downward direction.

* * * * *